United States Patent
Goel et al.

(10) Patent No.: US 8,687,521 B1
(45) Date of Patent: *Apr. 1, 2014

(54) AVOIDING MESH PATH DISCOVERY IN WIRELESS MESH NETWORKS

(75) Inventors: Sandesh Goel, Pune (IN); Ashish Kumar Shukla, Pune (IN)

(73) Assignee: Marvell International Ltd., Hamilton (BM)

( * ) Notice: Subject to any disclaimer, the term of this patent is extended or adjusted under 35 U.S.C. 154(b) by 188 days.

This patent is subject to a terminal disclaimer.

(21) Appl. No.: 13/346,177

(22) Filed: Jan. 9, 2012

Related U.S. Application Data (63) Continuation of application No. 12/464,958, filed on May 13, 2009, now Pat. No. 8,094,637.

(60) Provisional application No. 61/118,731, filed on Dec. 1, 2008.

(51) Int. Cl.
*H04L 12/28* (2006.01)
*H04L 12/56* (2011.01)

(52) U.S. Cl.
USPC .......................... 370/254; 370/338; 370/401

(58) Field of Classification Search
USPC ........................................ 370/248, 254, 351
See application file for complete search history.

(56) References Cited

U.S. PATENT DOCUMENTS

| | | | |
|---|---|---|---|
| 6,738,354 B1 | 5/2004 | Ashwood Smith | |
| 7,554,998 B2 | 6/2009 | Simonsson et al. | |
| 7,693,093 B2 | 4/2010 | Riedel et al. | |
| 7,729,290 B2 * | 6/2010 | Saleh et al. | 370/254 |
| 7,830,786 B2 * | 11/2010 | Atlas et al. | 370/217 |
| 7,911,962 B2 | 3/2011 | Khuu et al. | |
| 2003/0202469 A1 | 10/2003 | Cain | |
| 2004/0228304 A1 | 11/2004 | Riedel et al. | |
| 2005/0068970 A1 | 3/2005 | Srikrishna et al. | |
| 2005/0078659 A1 | 4/2005 | Ashwood Smith | |
| 2006/0092857 A1 * | 5/2006 | Ansari et al. | 370/254 |

(Continued)

OTHER PUBLICATIONS

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

(Continued)

*Primary Examiner* — Edan Orgad
*Assistant Examiner* — Emmanuel Maglo (57) ABSTRACT

A network interface of a first mesh point device, the network interface including a memory and a medium access controller. In response to the first mesh point device receiving a frame, the medium access controller determines whether a mesh path for routing the frame from the first mesh point device to a second mesh point device is stored in the memory. In response to a mesh path not being stored in the memory, and prior to performing a mesh path discovery protocol, the medium access controller (i) determines whether the second mesh point device is one hop from the first mesh point device, and if so selects a one hop path for routing the frame to the second mesh point device, otherwise (ii) uses the mesh path discovery protocol to determine a mesh path for routing the frame to the second mesh point device.

18 Claims, 6 Drawing Sheets

(56) References Cited

U.S. PATENT DOCUMENTS

| | | | |
|---|---|---|---|
| 2006/0153081 A1 | 7/2006 | Simonsson et al. | |
| 2006/0256769 A1 | 11/2006 | Cho et al. | |
| 2007/0091871 A1 | 4/2007 | Taha | |
| 2007/0189249 A1* | 8/2007 | Gurevich et al. | 370/338 |
| 2008/0084855 A1 | 4/2008 | Rahman | |
| 2008/0095059 A1* | 4/2008 | Chu | 370/238 |
| 2008/0205420 A1 | 8/2008 | Srikrishna et al. | |
| 2008/0298251 A1 | 12/2008 | Khuu et al. | |
| 2008/0316997 A1 | 12/2008 | Zeng et al. | |
| 2008/0317047 A1 | 12/2008 | Zeng et al. | |
| 2009/0003214 A1 | 1/2009 | Vaswani et al. | |
| 2009/0010190 A1* | 1/2009 | Gong | 370/311 |
| 2009/0059934 A1 | 3/2009 | Aggarwal et al. | |
| 2009/0109870 A1 | 4/2009 | Metke et al. | |
| 2009/0268652 A1 | 10/2009 | Kneckt et al. | |
| 2009/0279449 A1* | 11/2009 | Kneckt et al. | 370/253 |
| 2009/0290518 A1 | 11/2009 | Gossain et al. | |
| 2010/0097971 A1 | 4/2010 | Kang et al. | |
| 2010/0115272 A1 | 5/2010 | Batta | |
| 2010/0172249 A1 | 7/2010 | Liu | |
| 2010/0278118 A1 | 11/2010 | Gossain et al. | |

OTHER PUBLICATIONS

IEEE Std 802.11b-1999/Cor Jan. 2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications; Amendment 2: Higher-Speed Physical Layer (PHY) extension in the 2.4 GHz band-Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); DRAFT Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE Std 802.11h™—2003 [Amendment to IEEE Std 802.11™, 1999 Edition (Reaff 2003) as amended by IEEE Stds 802.11a™—1999, 802.11b™—1999, 802.11b™—1999/Cor Jan. 2001, 802.11d™—2001, 802.11g™—2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.11n; IEEE 802.11-04/0889r6; IEEE P802.11 Wireless LANs; TGn Sync Proposal Technical Specification; Syed Aon Mujtaba; Agere System Inc.; May 18, 2005; 131 pages.

IEEE 802.16/2001; IEEE Standard for Local and metropolitan area networks; Part 16: Air Interface for Fixed Broadband Wireless Access Systems; IEEE Computer Society and the IEEE Microwave Theory and Techniques Society; Sponsored by the LAN/MAN Standards Committee; Apr. 8, 2002; 349 pages.

IEEE Std 802.16/2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.16a™—2003 (Amendment to IEEE Std 802.16™—2001) IEEE Standard for Local and metropolitan area networks; Part 16: Air Interface for Fixed Broadband Wireless Access Systems; Amendment 2: Medium Access Control Modifications and Additional Physical Layer Specifications for 2-11 GHz; IEEE Computer Society and the IEEE Microwave Theory and Techniques Society; Apr. 1, 2003; 318 pages.

802.16e™—2005 and IEEE Std 802.16™—2004/Cor1-2005 (Amendment and Corrigendum to IEEE Std 802.16-2004; IEEE Standard for Local and metropolitan area networks; Part 16: Air Interface for Fixed Broadband Wireless Access Systems; Amendment 2: Physical and Medium Access Control Layers for Combined Fixed and Mobile Operation in Licensed Bands and Corrigendum 1; IEEE Computer Society and the IEEE Microwave Theory and Techniques Society; Feb. 28, 2006; 864 pages.

ISO/IEC 8802-11; ANSI/IEEE Std. 802.11; First Edition 1999-00-00; Information technology—Telecommunications and information exchange between systems—Local and metropolitan area networks—Specific requirements—Part 11: Wireless LAN Medium Access Control (MAC) and Physical Layer (PHY) specifications; 531 pages.

IEEE P802.11s™/D2.0; Mar. 2008; Draft Standard for Information Technology—Telecommunications and information exchange between systems—Local and metropolitan area networks—Specific requirements—Part 11: Wireless LAN Medium Access Control (MAC) and Physical Layer (PHY) specifications; Amendment <number>: Mesh Networking; 263 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

IEEE Std 802.11K™—2008; (Amendment to IEEE Std 802.11™—2007); IEEE Standard for Information technology—Telecommunications and information exchange between systems—Local and metropolitan area networks—Specific requirements—Part 11: Wireless LAN Medium Access Control (MAC) and Physical Layer (PHY) Specifications; Amendment 1: Radio Resource Measurement of Wireless LANs; IEEE Computer Society; Sponsored by the LAN/MAN Standards Committee; Jun. 12, 2008; 244 pages.

Path Discovery Mechanism: Sanity; From OLPC; Jun. 17, 2008; 13 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

* cited by examiner

AVOIDING MESH PATH DISCOVERY IN WIRELESS MESH NETWORKS

CROSS-REFERENCE TO RELATED APPLICATIONS

This application is a continuation of U.S. patent application Ser. No. 12/464,958, filed on May 13, 2009, which claims benefit of U.S. Provisional Application No. 61/118,731, filed on Dec. 1, 2008. The disclosures of the above applications are incorporated herein by reference in their entirety.

BACKGROUND

The present disclosure relates generally to mesh networks. More particularly, the present disclosure relates to mesh path discovery in wireless mesh networks.

This background description is provided for the purpose of presenting the context of this disclosure. Nothing in this background section that does not otherwise qualify as prior art against this disclosure is either expressly or impliedly admitted as prior art against this disclosure.

Wireless mesh networks are growing in popularity, in part due to their ability to improve the range of wireless communications while reducing the power consumption of the wireless devices employed. Wireless mesh networks include a plurality of mesh points that communicate wirelessly with one another to route data. Data is propagated from a source mesh point to a destination mesh point either directly (over a "one-hop" mesh path) or by a mesh path comprising one or more intermediate mesh points (a "multi-hop" mesh path). Therefore, each mesh point within a wireless mesh network operates as both receiver and transmitter to route data between the source and destination mesh points within a given mesh path.

In general, mesh networks are often deployed in an ad-hoc manner, and in a resource-constrained environment. In some deployments, for example in a classroom where each student has a laptop configured as a mesh point, most of the mesh points are in direct communication range of each other. In these "dense mesh" deployments, most of the mesh points are one-hop neighbors.

To discover paths to other mesh points, for example when no path exists or when a current path expires, each mesh point broadcasts management frames such as path request frames. However, in a dense mesh, the probability of frame collision is very high. It has been shown that frame collision can interfere with path discovery mechanisms, resulting in multi-hop paths between mesh points that are one-hop neighbors. In addition, these collisions can cause path discovery to consume significant resources, such as the battery power of the mesh points, the bandwidth of the wireless medium, and the like.

SUMMARY

A network interface of a first mesh point device is provided. The network interface includes a memory and a medium access controller. In response to the first mesh point device receiving a frame to be transmitted to a second mesh point device, the medium access controller is configured to determine whether a mesh path for routing the frame from the first mesh point device to the second mesh point device is stored in the memory. In response to a mesh path for routing the frame from the first mesh point device to the second mesh point device not being stored in the memory and prior to performing a mesh path discovery protocol to determine a mesh path for routing the frame from the first mesh point device to the second mesh point device, the medium access controller is configured to determine whether the second mesh point device is one hop from the first mesh point device. The medium access controller determines if the second mesh point device is one hop from the first mesh point device without using the mesh path discovery protocol. If the second mesh point device is one hop from the first mesh point device the medium access controller selects a one hop path for routing the frame from the first mesh point device to the second mesh point device, otherwise the medium access controller uses the mesh path discovery protocol to determine a mesh path for routing the frame from the first mesh point device to the second mesh point device.

In one aspect, an apparatus is provided and includes: a mesh path module adapted to select a mesh path between a first mesh point in a mesh network and a second mesh point in the mesh network, wherein the mesh path module includes a neighbor discovery module adapted to determine whether the second mesh point is one hop from the first mesh point, a one-hop mesh path module adapted to select a one-hop mesh path between the first mesh point and the second mesh point when the second mesh point is one hop from the first mesh point, and a multi-hop mesh path module adapted to discover a multi-hop mesh path between the first mesh point and the second mesh point only when it is determined that the second mesh point is not one hop from the first mesh point.

The apparatus may include one or more of the following features. In some implementations, the mesh path module further includes: a path loss module adapted to measure a path loss of the one-hop mesh path between the first mesh point and the second mesh point; wherein the multi-hop mesh path module is further adapted to discover a multi-hop mesh path between the first mesh point and the second mesh point when the path loss of the one-hop mesh path exceeds a predetermined threshold. Some implementations include a forwarding module adapted to forward frames received by the first mesh point and addressed to the second mesh point according to an entry for the second mesh point in a forwarding table; wherein the mesh path module is further adapted to generate the entry for the second mesh point in the forwarding table in order to establish the one-hop path between the first mesh point to the second mesh point. Some implementations include a path lifetime module adapted to determine when a path lifetime ends for the entry for the second mesh point in the forwarding table; wherein the neighbor discovery module is further adapted to determine whether the second mesh point is one hop from the first mesh point in response to an end of the path lifetime for the entry for the second mesh point in the forwarding table.

In one aspect, a method for finding a mesh path between a first mesh point in a mesh network and a second mesh point in the mesh network is provided. The method includes: determining whether the second mesh point is one hop from the first mesh point; establishing a one-hop mesh path between the first mesh point and the second mesh point when the second mesh point is one hop from the first mesh point; and discovering a multi-hop mesh path between the first mesh point and the second mesh point only when the second mesh point is not one hop from the first mesh point.

Implementations of the method can include one or more of the following features. Some implementations include measuring a path loss of the one-hop mesh path between the first mesh point and the second mesh point; and discovering a multi-hop mesh path between the first mesh point and the second mesh point when the path loss of the one-hop mesh path exceeds a predetermined threshold. Some implementations include measuring a one-hop path loss of the multi-hop mesh path between the first mesh point and the second mesh point; and selecting a one-hop mesh path between the first mesh point and the second mesh point when the one-hop path loss of the multi-hop mesh path falls below a predetermined threshold. Some implementations include forwarding frames received by the first mesh point and addressed to the second mesh point according to an entry for the second mesh point in a forwarding table; wherein establishing the one-hop path between the first mesh point and the second mesh point includes generating the entry for the second mesh point in the forwarding table. Some implementations include determining when a path lifetime ends for the entry for the second mesh point in the forwarding table; and determining whether the second mesh point is one hop from the first mesh point in response to an end of the path lifetime for the entry for the second mesh point in the forwarding table.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DESCRIPTION

The present disclosure describes techniques that allow mesh points to avoid mesh path discovery when the destination mesh point is a one-hop neighbor. As used herein, mesh points are one-hop neighbors when they are in direct communication range of each other.

By default each mesh point can use mesh path discovery protocols such as Hybrid Wireless Mesh Protocol (HWMP) or multi-hop routing. Implementations disclosed herein may include, before starting mesh path discovery, a mesh point determining whether the destination mesh point is a one-hop neighbor, and if so, sending frames directly to the destination mesh point instead of performing mesh path discovery. If the mesh point fails to deliver a frame in this manner, for example because the destination mesh point is no longer in direct communication range, the mesh point may perform mesh path discovery, for example using HWMP.

Mesh points can be configured to use the mesh path discovery avoidance techniques disclose herein. Furthermore, mesh points can advertise these capabilities in mesh beacon and probe response frames and the like. A driver API can be provided to enable and disable these features.

Figure 1:
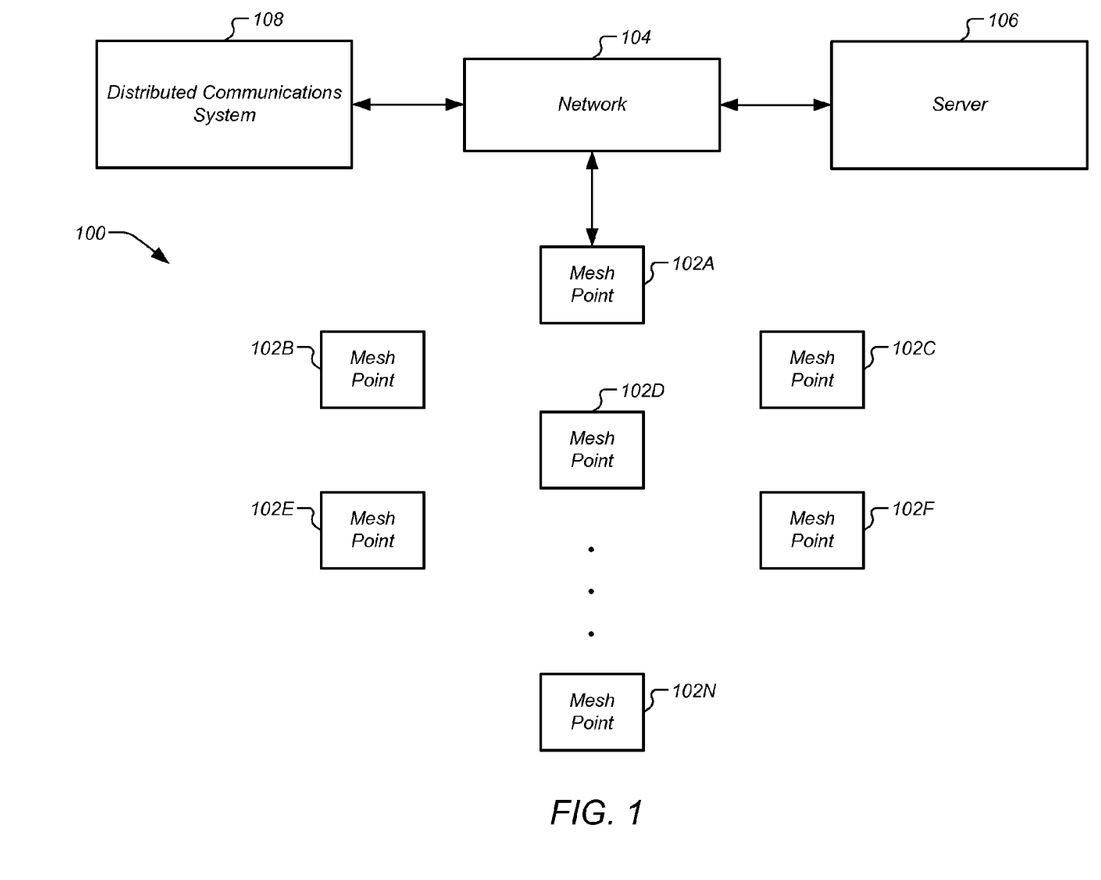
FIG. 1 shows an exemplary wireless mesh network.

FIG. 1 shows an exemplary wireless mesh network 100. Wireless mesh network 100 can be compliant with various protocols including at least one of the Institute of Electrical and Electronics Engineers (IEEE) standards 802.11, 802.11a, 802.11b, 802.11g, 802.11h, 802.11k, 802.11n, 802.11s, 802.16, 802.16a, 802.16e, 802.16-2004, and 802.20, and/or the Bluetooth standard published by the Bluetooth Special Interest Group (SIG). The aforementioned standards are hereby incorporated by reference in their entirety.

Wireless mesh network 100 includes a plurality of mesh points 102A-102N, referred to collectively as mesh points 102. Wireless mesh network 100 can be a dense wireless mesh network that includes a substantial number of mesh points 102 (for example, eight or more mesh points) that are within communication range of each other. Wireless mesh network 100 can include a variable number of mesh points 102. Mesh points 102 can communicate with one another via wireless mesh links (not shown) over a wireless communication medium. Each mesh point 102 within wireless mesh network 100 can serve as both receiver and transmitter to communicate data between mesh points 102.

Wireless mesh network 100 can include one or more mesh points 102 (for example, mesh point 102A) that provide a connection to a wired network 104 and are commonly referred to as mesh portals. Mesh portals provide a gateway enabling data to be relayed between mesh points 102 and various wired devices (not shown) in communication with network 104. In addition, users of various wireless devices (not shown) within wireless mesh network 100 can communicate with one another using mesh points 102. The wireless devices can include, but are not limited to, a desktop computer, a personal digital assistant (PDA), a mobile phone, a laptop, a personal computer (PC), a printer, a digital camera, an internet protocol (IP) phone, and the like. Network 104 can be a local area network (LAN), a wide area network (WAN), or another network configuration. Network 104 can include other points such as a server 106 and can be connected to a distributed communications system 108 such as the Internet.

Figure 2:
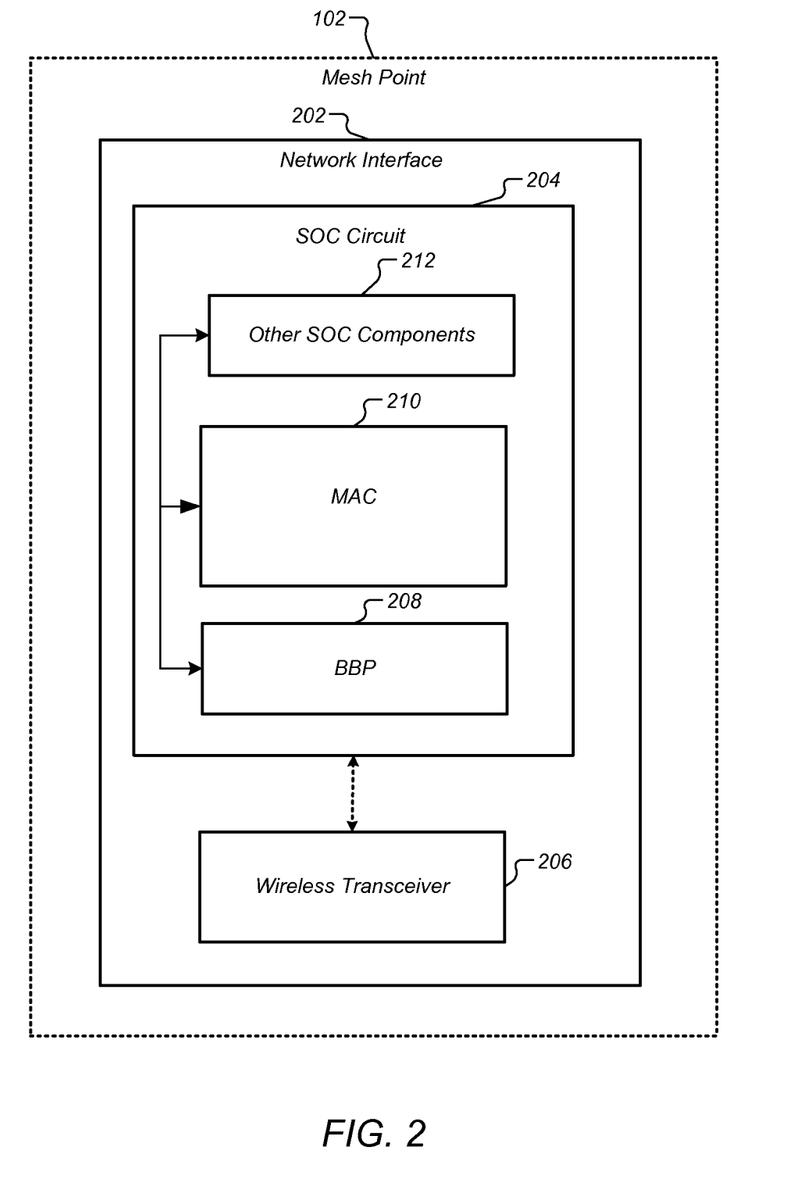
FIG. 2 shows elements of a mesh point of FIG. 1 according to the present disclosure.

FIG. 2 shows elements of a mesh point 102 of FIG. 1. Although the elements of mesh point 102 are presented in one arrangement, other implementations may feature other arrangements, as will be apparent to one skilled in the relevant arts based on the disclosure and teachings provided herein. For example, the elements of mesh point 102 can be implemented in hardware, software, or combinations thereof. In some implementations, mesh point 102 is compliant with all or part of IEEE standard 802.11, including amendment 802.11s.

Referring to FIG. 2, mesh point 102 includes a network interface 202 that includes a system-on-chip circuit (SOC) circuit 204 and a wireless transceiver 206. SOC circuit 204 includes a baseband processor (BBP) 208, a media access control (MAC) device 210, and other SOC components, identified collectively at 212, such as interfaces, firmware, memory, and/or other processors. Wireless transceiver 206 along with BBP 208 communicates with MAC device 210. BBP 208 processes signals received from and/or transmitted to wireless transceiver 206. Wireless transceiver 206 modulates signals received from BBP 208 and demodulates signals prior to transmitting the signals to BBP 208. Additionally wireless transceiver 206 transmits/receives frames (for example, a probe request or a probe response) to/from various other mesh points 102 in wireless mesh network 100 (FIG. 1). Each mesh point 102 can transmit data streams having various types of frames and/or data structures.

MAC device 210 is configured to execute MAC layer operations such as supervising and maintaining communications between mesh points 102. MAC device 210 can perform operations including, but not limited to, scanning wireless mesh network 100 to discover mesh points 102 that are one-hop neighbors and their respective functionalities.

Figure 3:
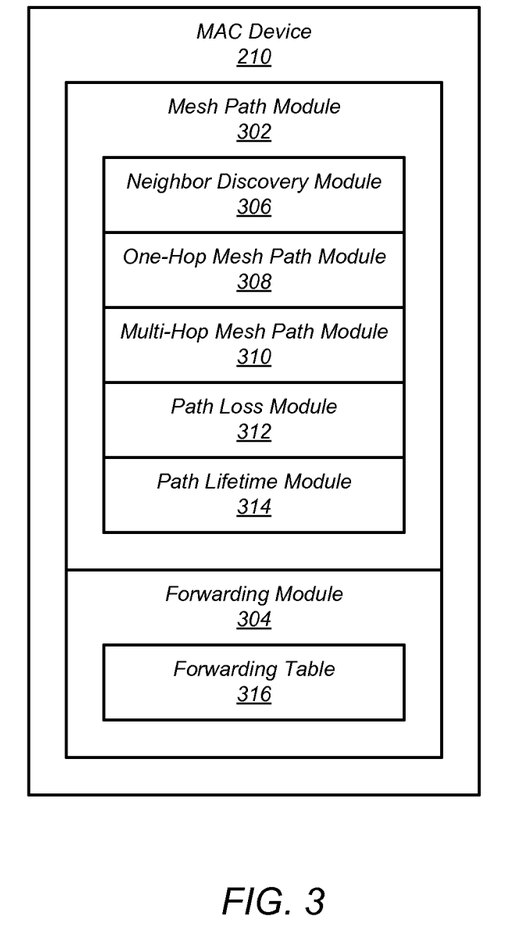
FIG. 3 shows elements of the MAC device of FIG. 2 according to the present disclosure.

FIG. 3 shows elements of MAC device 210 of FIG. 2. Although the elements of MAC device 210 are presented in one arrangement, other implementations may feature other arrangements, as will be apparent to one skilled in the relevant arts based on the disclosure and teachings provided herein. For example, the elements of MAC device 210 can be implemented in hardware, software, or combinations thereof.

Referring to FIG. 3, in one implementation, MAC device 210 includes a mesh path module 302 and a forwarding module 304. Mesh path module 302 includes a neighbor discovery module 306, a one-hop mesh path module 308, a multi-hop mesh path module 310, a path loss module 312, and a path lifetime module 314. Forwarding module 304 includes a forwarding table 316, which can be implemented as a memory or the like. As used herein, the term module can refer to an Application Specific Integrated Circuit (ASIC), an electronic circuit, a processor (shared, dedicated, or group) and memory that execute one or more software or firmware programs, a combinatorial logic circuit, other suitable components that provide the described functionality, combinations thereof, and the like.

Figure 4:
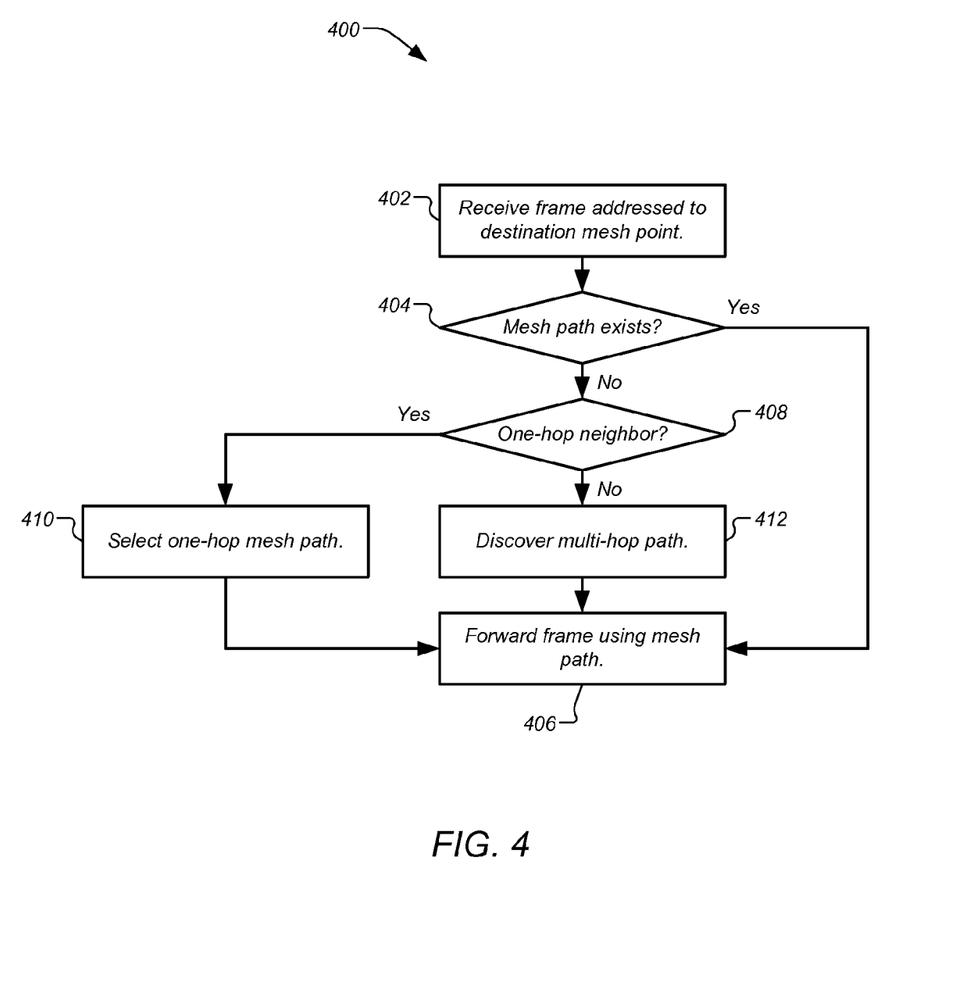
FIG. 4 shows a process for the mesh point of FIGS. 1-3 according to implementations where the mesh point receives a frame addressed to another mesh point.

Multiple scenarios exist where a mesh point should select a mesh path. In one such scenario, a frame arrives that is addressed to a destination to which there is no existing mesh path. FIG. 4 shows a process 400 for mesh point 102 of FIGS. 1-3 where mesh point 102 receives a frame addressed to another mesh point 102. Although the elements of process 400 are presented in one arrangement, other implementations may feature other arrangements, as will be apparent to one skilled in the relevant arts based on the disclosure and teachings provided herein. For example, in various implementations, some or all of the steps of process 400 can be executed in a different order, concurrently, and the like. In some implementations, process 400 is compliant with all or part of IEEE standard 802.11, including amendment 802.11s.

For clarity in the description of FIG. 4, the mesh point 102 receiving the frame is referred to as source mesh point 102A while the mesh point 102 to which the frame is addressed is referred to as destination mesh point 102B. However, it will be appreciated that process 400 can refer to any two mesh points 102 in wireless mesh network 100. In the description of FIG. 4, source mesh point 102A is implemented as shown in FIGS. 2 and 3, while destination mesh point 102B can be implemented in any manner.

Referring to FIG. 4, source mesh point 102A receives a frame addressed to destination mesh point 102B (step 402). In response to the receipt of the frame, mesh path module 302 determines whether a mesh path exists from source mesh point 102A to destination mesh point 102B (step 404). In particular, mesh path module 302 determines whether an entry exists in forwarding table 316 for destination mesh point 102B. If a mesh path exists from source mesh point 102A to destination mesh point 102B, then forwarding module 304 forwards the frame to destination mesh point 102B using that mesh path (step 406).

However, it is possible that no mesh path exists to destination mesh point 102B when the frame is received (step 404). At this point, conventional mesh points default to mesh path discovery, using protocols such as HWMP. However, in the present implementation, when no mesh path exists to destination mesh point 102B, source mesh point 102A attempts to avoid mesh path discovery. In particular, neighbor discovery module 306 determines whether destination mesh point 102B is one hop from source mesh point 102A. That is, neighbor discovery module 306 determines whether destination mesh point 102B and source mesh point 102A are one-hop neighbors (step 408). Neighbor discovery module 306 can identify its one-hop neighbors using a conventional neighbor discovery protocol based on received beacons and probe responses, an external protocol, or the like. Alternatively, neighbor discovery module 306 can employ a history of mesh paths found by mesh path module 302 to determine its one-hop neighbors. Mesh paths generally have predetermined lifetimes, after which they are deleted. However, in implementations using mesh path history, mesh paths can be saved beyond their lifetimes, and marked as inactive.

If neighbor discovery module 306 determines that destination mesh point 102B is one hop from source mesh point 102A, then one-hop mesh path module 308 selects the one-hop mesh path directly between source mesh point 102A and destination mesh point 102B (step 410). In particular, one-hop mesh path module 308 creates an entry in forwarding table 316 for the one-hop path to destination mesh point 102B. Forwarding module 304 then forwards the received frame to destination mesh point 102B using the mesh path represented by the entry (step 406).

However, if and when the frame is received, no mesh path exists for destination mesh point 102B (step 404), and destination mesh point 102B is not a one-hop neighbor of source mesh point 102A (step 408), then mesh path module 302 switches to mesh path discovery (step 412). That is, multi-hop mesh path module 310 discovers a multi-hop mesh path between source mesh point 102A and destination mesh point 102B only when destination mesh point 102B is not one hop from source mesh point 102A. Multi-hop mesh path module 310 can employ any process for discovering the multi-hop mesh path, for example including HWMP, multi-hop routing, and the like. Once the multi-hop mesh path has been discovered and recorded in forwarding table 316, forwarding module 304 forwards the received frame to destination mesh point 102B using the discovered mesh path (step 406).

In various implementations, to limit mesh path discovery overhead, HWMP can take advantage of the high probability that destination mesh point 102B has not moved far from source mesh point 102A by employing an expanding ring mesh time-to-live (TTL) search as follows. Mesh path discovery begins with a low TTL value, for example TTL=2. If no mesh path is found to destination mesh point 102B with the current TTL value, the TTL value is incremented by a TTL_INCR value, for example TTL_INCR=3, and mesh path discovery is repeated. This process can be repeated up to a predetermined maximum number of attempts, for example MAX_ROUTE_DISCOVERY_ATTEMPT=3. The parameters TTL, TTL_INCR, and MAX_ROUTE_DISCOVERY_ATTEMPT can be configurable.

Figure 5:
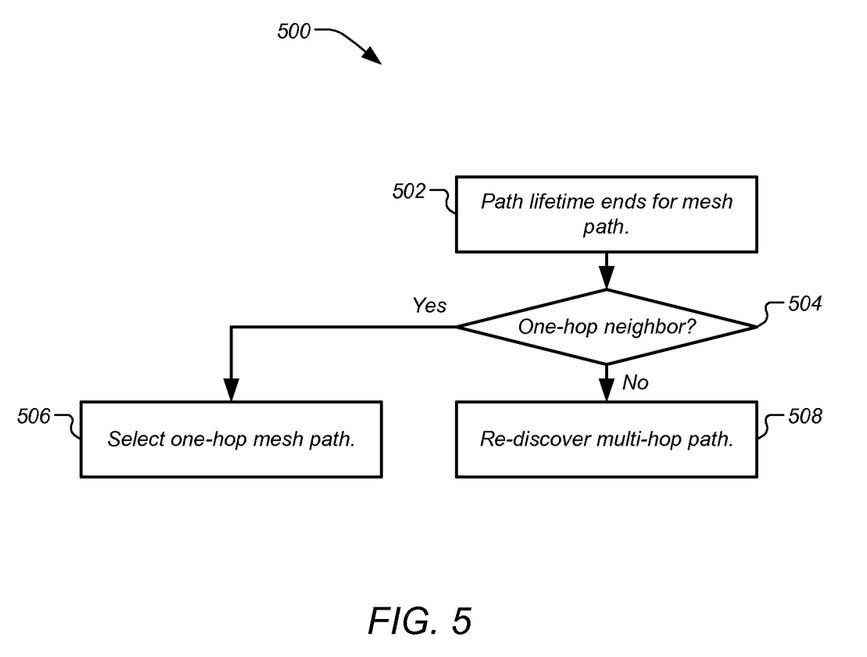
FIG. 5 shows a process for the mesh point of FIGS. 1-3 according to implementations where the path lifetime for a mesh path ends.

Another scenario where a mesh point should select a mesh path occurs when an existing mesh path expires, that is, when the path lifetime for the mesh path ends. FIG. 5 shows a process 500 for mesh point 102 of FIGS. 1-3 where the path lifetime for a mesh path ends. Although the elements of process 500 are presented in one arrangement, other implementations may feature other arrangements, as will be apparent to one skilled in the relevant arts based on the disclosure and teachings provided herein. For example, in various implementations, some or all of the steps of process 500 can be executed in a different order, concurrently, and the like. In some implementations, process 500 is compliant with all or part of IEEE standard 802.11, including amendment 802.11s.

For clarity in the description of FIG. 5, the mesh point 102 storing the mesh path that expires is referred to as source mesh point 102A while the mesh point 102 that is the destination for that mesh path is referred to as destination mesh point 102B. However, it will be appreciated that process 500 can refer to any two mesh points 102 in wireless mesh network 100. In the description of FIG. 5, source mesh point 102A is implemented as shown in FIGS. 2 and 3, while destination mesh point 102B can be implemented in any manner.

Referring to FIG. 5, the path lifetime for the mesh path between mesh point 102A and destination mesh point 102B ends (step 502). In particular, path lifetime module 314 determines when the path lifetime ends for the mesh path entry in forwarding table 316. As noted above, mesh paths generally have predetermined lifetimes, after which they are deleted. Path lifetime module 314 can operate to periodically refresh all active mesh paths that originate at mesh point 102A using a single, common timer. Upon the expiration of a refresh time defined by the timer, path lifetime module 314 refreshes all active mesh paths originating at mesh point 102A based on the transmission of a route request frame. In the present implementation, the route request frame can include data related to all the endpoints (that is, the destination mesh points) associated with the mesh paths originating at mesh point 102A. In response to receiving the route request frame, each destination mesh point 102 then generates a respective route reply frame, which is received by mesh point 102A. Each route reply frame includes data indicative of the optimal route to a respective destination mesh point within wireless mesh network 100.

At this point, conventional mesh points default to mesh path discovery, using protocols such as HWMP. However, in the present implementation, after path expiration, mesh point 102A attempts to avoid mesh path discovery. In particular, neighbor discovery module 306 determines whether destination mesh point 102B is one hop from source mesh point 102A. That is, neighbor discovery module 306 determines whether destination mesh point 102B and source mesh point 102A are one-hop neighbors (step 504), for example according to the techniques described above.

If neighbor discovery module 306 determines that destination mesh point 102B is one hop from source mesh point 102A, then one-hop mesh path module 308 selects the one-hop mesh path directly between source mesh point 102A and destination mesh point 102B (step 506). In particular, one-hop mesh path module 308 creates an entry in forwarding table 316 for the one-hop path to destination mesh point 102B.

However, if and when the path lifetime for a mesh path originating from mesh point 102A ends, destination mesh point 102B is not a one-hop neighbor of source mesh point 102A (step 504), then mesh path module 302 switches to mesh path discovery (step 508). That is, multi-hop mesh path module 310 discovers a multi-hop mesh path between source mesh point 102A and destination mesh point 102B only when destination mesh point 102B is not one hop from source mesh point 102A. Multi-hop mesh path module 310 can employ any process for discovering the multi-hop mesh path, as described above.

In some cases, while employing a one-hop path selected during mesh path discovery avoidance, as described above, mesh point 102A and/or mesh point 102B may physically move, and path loss associated with communication link between mesh point 102A and mesh point 102B may vary. Path loss generally increases because the mesh points 102 sharing the mesh path have moved away from each other. However, path loss can occur for other reasons. When the path loss of a one-hop mesh path becomes too great, a mesh point 102 can switch to mesh path discovery by discovering a multi-hop path to the destination mesh point 102. This avoids active communication link failure by using a multi-hop path when a one-hop path is about to fail due to the fact that mesh points 102 are moving away from each other and may soon go out of communication range. If while using the multi-hop mesh path the mesh points 102 again come within direct communication range, one or more of the mesh points 102 can switch to mesh path discovery avoidance by again selecting a one-hop mesh path.

Figure 6:
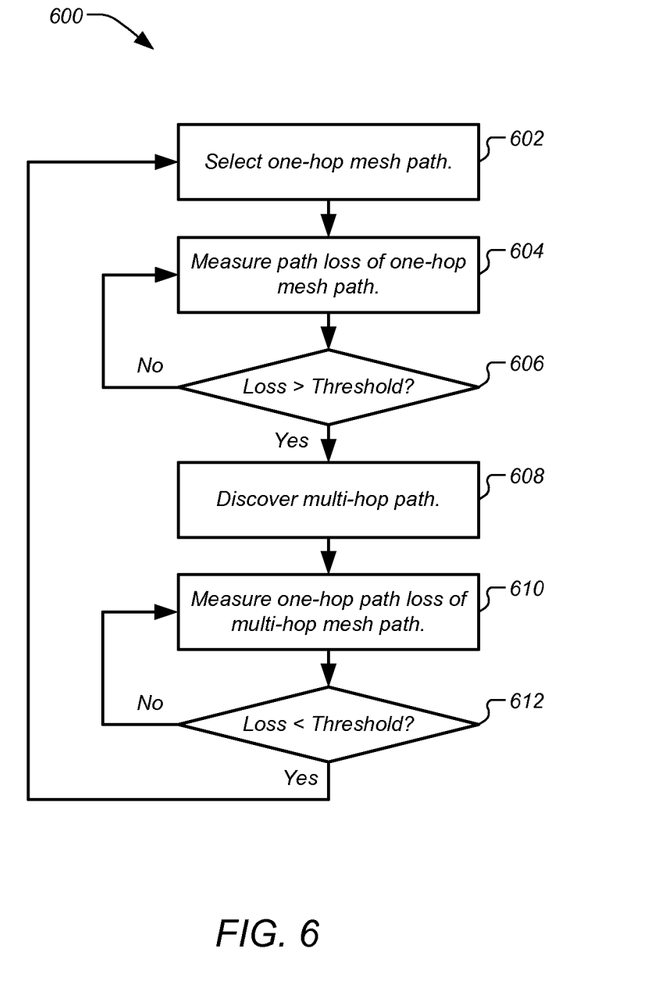
FIG. 6 shows a process employing path loss for mesh point of FIGS. 1-3 according to the present disclosure.

FIG. 6 shows a process 600 employing path loss for mesh point 102 of FIGS. 1-3. Although the elements of process 600 are presented in one arrangement, other implementations may feature other arrangements, as will be apparent to one skilled in the relevant arts based on the disclosure and teachings provided herein. For example, in various implementations, some or all of the steps of process 600 can be executed in a different order, concurrently, and the like. In some implementations, process 600 is compliant with all or part of IEEE standard 802.11, including amendment 802.11s.

For clarity in the description of FIG. 6, the mesh point 102 originating the one-hop mesh path that experiences path loss is referred to as source mesh point 102A while the mesh point 102 that is the destination for that mesh path is referred to as destination mesh point 102B. However, it will be appreciated that process 600 can refer to any two mesh points 102 in wireless mesh network 100. In the description of FIG. 6, source mesh point 102A is implemented as shown in FIGS. 2 and 3, while destination mesh point 102B can be implemented in any manner.

Referring to FIG. 6, one-hop mesh path module 308 selects a one-hop mesh path directly from source mesh point 102A to destination mesh point 102B (step 602), as described above. At some later time, path loss module 312 measures a path loss of the one-hop mesh path (step 604). Path loss can be derived from the Received Signal Strength Indicator (RSSI) values in frames received over the one-hop mesh path. Path loss can also be determined based on radio resource measurement frames, for example, as defined by IEEE standard 802.11k. Other techniques can be used as well.

If the path loss measured for the one-hop mesh path exceeds a predetermined threshold (step 606), then mesh path module 302 switches to mesh path discovery (step 608). That is, multi-hop mesh path module 310 discovers a multi-hop mesh path between source mesh point 102A and destination mesh point 102B. Multi-hop mesh path module 310 can employ any process for discovering the multi-hop mesh path, as described above.

At some later time, path loss module 312 measures a "one-hop path loss" of the multi-hop mesh path (step 610). Path loss module 312 can measure the one-hop path loss based on RSSI values of the frames received directly from destination mesh point 102B. However, in general, path loss is not same in both directions. Therefore, in some implementations, destination mesh point 102B measures the path loss, and reports the path loss to source mesh point 102A.

If the one-hop path loss of the multi-hop mesh path falls below a predetermined threshold (step 612), then mesh path module 302 switches to mesh path discovery avoidance. That is, one-hop mesh path module 308 selects a one-hop mesh path directly from source mesh point 102A to destination mesh point 102B (step 602), as described above. Process 600 can be repeated as many times as desired.

Various mesh point apparatuses and elements are disclosed herein and can be implemented in digital electronic circuitry, or in computer hardware, firmware, software, or in combinations of them. The mesh point apparatuses and elements can be implemented in a computer program product tangibly embodied in a machine-readable storage device for execution by a programmable processor; and method steps can be performed by a programmable processor executing a program of instructions to perform functions by operating on input data and generating output. The mesh point apparatuses and elements can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A network interface of a first mesh point device, the network interface comprising:
   a memory; and
   a medium access controller, wherein in response to the first mesh point device receiving a frame to be transmitted to a second mesh point device, the medium access controller is configured to determine whether a mesh path for routing the frame from the first mesh point device to the second mesh point device is stored in the memory,
   wherein, in response to a mesh path for routing the frame from the first mesh point device to the second mesh point device not being stored in the memory, and prior to performing a mesh path discovery protocol to determine a mesh path for routing the frame from the first mesh point device to the second mesh point device, the medium access controller is configured to
   (i) determine, without using the mesh path discovery protocol, whether the second mesh point device is one hop from the first mesh point device, and if so select a one hop path for routing the frame from the first mesh point device to the second mesh point device, otherwise
   (ii) use the mesh path discovery protocol to determine a mesh path for routing the frame from the first mesh point device to the second mesh point device.

2. The network interface of claim 1, wherein the medium access controller is configured to use a neighbor discovery protocol to determine whether the second mesh point device is one hop from the first mesh point device.

3. The network interface of claim 1, wherein the medium access controller is configured to determine whether the second mesh point device is one hop from the first mesh point device by sending the frame to the second mesh point device.

4. The network interface of claim 1, wherein the mesh path discovery protocol comprises a hybrid wireless mesh protocol or a multi-hop routing protocol.

5. The network interface of claim 1, wherein the medium access controller is configured to employ a history of previously found mesh paths to determine whether the second mesh point device is one hop from the first mesh point.

6. The network interface of claim 1, wherein, in response to a mesh path for routing the frame from the first mesh point device to the second mesh point device being stored in the memory, the medium access controller is configured to select the mesh path for routing the frame from the first mesh point device to the second mesh point device.

7. The network interface of claim 1, wherein:
   the memory is configured to store a forwarding table; and
   the medium access controller is configured to determine whether a mesh path for routing the frame from the first mesh point device to the second mesh point device is stored in the memory by determining whether an entry corresponding to the second mesh point device exists in the forwarding table.

8. The network interface of claim 1, wherein the medium access controller comprises:
   a path loss module configured to measure a one-hop path loss of a multi-hop mesh path between the first mesh point device and the second mesh point device; and
   a mesh path module configured to select a one-hop mesh path between the first mesh point device and the second mesh point device when the one-hop path loss of the multi-hop mesh path decreases to a value less than a predetermined threshold.

9. The network interface of claim 1, wherein the medium access controller comprises:
   a forwarding module configured to forward the frame according to an entry for the second mesh point device in a forwarding table, wherein the frame is addressed to the second mesh point device, and wherein the forwarding table is stored in the memory; and
   a mesh path module configured to generate the entry in the forwarding table for the second mesh point device in order to establish a one-hop mesh path from the first mesh point device to the second mesh point device.

10. The network interface of claim 9, wherein the medium access controller comprises:
    a lifetime module configured to determine when a path lifetime ends for the entry; and
    a discovery module configured to determine whether the second mesh point device is one hop from the first mesh point device in response to the path lifetime for the entry ending.

11. The network interface of claim 10, wherein:
    the first mesh point device comprises a desktop computer, a personal digital assistant (PDA), a mobile phone, a laptop, a personal computer (PC), a printer, a digital camera, or an internet protocol (IP) phone; and
    the second mesh point device comprises a desktop computer, a personal digital assistant (PDA), a mobile phone, a laptop, a personal computer (PC), a printer, a digital camera, or an internet protocol (IP) phone.

12. A method comprising:
    receiving, at a first mesh point device, a frame to be forwarded to a second mesh point device; and determining whether a mesh path for routing the frame from the first mesh point device to the second mesh point device is stored in a memory of the first mesh point device, wherein, in response to a mesh path for routing the frame from the first mesh point device to the second mesh point device not being stored in the memory, and prior to performing a mesh path discovery protocol to determine a mesh path for routing the frame from the first mesh point device to the second mesh point device, (i) determining, without using the mesh path discovery protocol, whether the second mesh point device is one hop from the first mesh point device, and if so selecting a one hop path for routing the frame from the first mesh point device to the second mesh point device, otherwise (ii) using the mesh path discovery protocol to determine a mesh path for routing the frame from the first mesh point device to the second mesh point device.

13. The method of claim 12, wherein determining whether the second mesh point device is one hop from the first mesh point device comprises using a neighbor discovery protocol to determine whether the second mesh point device is one hop from the first mesh point device.

14. The method of claim 12, wherein determining whether the second mesh point device is one hop from the first mesh point device comprises sending the frame to the second mesh point device.

15. The method of claim 12, further comprising, wherein the mesh path discovery protocol comprises a hybrid wireless mesh protocol or a multi-hop routing protocol.

16. The method of claim 12, wherein determining whether the second mesh point device is one hop from the first mesh point device comprises employing a history of previously found mesh paths.

17. The method of claim 12, wherein:

the memory is configured to store a forwarding table; and determining whether a mesh path for routing the frame from the first mesh point device to the second mesh point device is stored in the memory comprises determining whether an entry corresponding to the second mesh point device exists in the forwarding table.

18. The method of claim 12, wherein:

the first mesh point device comprises a desktop computer, a personal digital assistant (PDA), a mobile phone, a laptop, a personal computer (PC), a printer, a digital camera, or an internet protocol (IP) phone; and the second mesh point device comprises a desktop computer, a personal digital assistant (PDA), a mobile phone, a laptop, a personal computer (PC), a printer, a digital camera, or an internet protocol (IP).

* * * * *